US009053207B2

(12) United States Patent
Tin et al.

(10) Patent No.: US 9,053,207 B2
(45) Date of Patent: Jun. 9, 2015

(54) ADAPTIVE QUERY EXPRESSION BUILDER FOR AN ON-DEMAND DATA SERVICE

(75) Inventors: Ramiah K. Tin, Pickering (CA); Stanislav Bliakhman, North York (CA); Victor Chan, Thornhill (CA); Ross McKegney, Toronto (CA); Jeffrey A. Shiner, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 11/672,736

(22) Filed: Feb. 8, 2007

(65) Prior Publication Data

US 2008/0195610 A1    Aug. 14, 2008

(51) Int. Cl.
 *G06F 7/00* (2006.01)
 *G06F 17/30* (2006.01)

(52) U.S. Cl.
 CPC .... *G06F 17/30935* (2013.01); *G06F 17/30448* (2013.01)

(58) Field of Classification Search
 None
 See application file for complete search history.

(56) References Cited

U.S. PATENT DOCUMENTS

| | | | |
|---|---|---|---|
| 7,260,572 B2 * | 8/2007 | Min et al. ............................... 1/1 |
| 7,454,413 B2 * | 11/2008 | Lakshminarayanan et al. .. 707/3 |
| 2005/0091197 A1 | 4/2005 | Dettinger et al. |
| 2005/0091208 A1 * | 4/2005 | Larson et al. ..................... 707/3 |
| 2006/0195427 A1 * | 8/2006 | Kilroy ............................... 707/3 |
| 2007/0078874 A1 * | 4/2007 | Stern et al. ..................... 707/101 |
| 2008/0114803 A1 * | 5/2008 | Chinchwadkar et al. ..... 707/102 |
| 2008/0120283 A1 * | 5/2008 | Liu et al. .......................... 707/4 |
| 2008/0120326 A1 * | 5/2008 | Kearsey et al. ............... 707/102 |
| 2008/0189258 A1 * | 8/2008 | Miejer et al. ..................... 707/4 |
| 2008/0189332 A1 * | 8/2008 | Winter ....................... 707/104.1 |

OTHER PUBLICATIONS

Raman, V., et al; Partial Results for Online Query Processing; ACM SIGMOD; 2002.

* cited by examiner

*Primary Examiner* — Rehana Perveen
*Assistant Examiner* — Raheem Hoffler
(74) *Attorney, Agent, or Firm* — Steven M. Greenberg, Esq.; CRGO LAW

(57) ABSTRACT

Embodiments of the present invention address deficiencies of the art in respect to database query management and execution and provide a novel and non-obvious method, system and apparatus for processing an adaptive query expression in an on-demand data service. In one embodiment of the invention, an adaptive query handling method can include receiving an initial query in a database driven application, parsing the initial query to identify a query expression key, matching the query expression key to an adaptive query expression, and transforming the adaptive query expression to a final query expression through a replacement of annotations in the adaptive query expression with static expressions conforming to a query language for the final query expression. Thereafter, the final query expression can be applied to a database subsystem for the database driven application.

20 Claims, 3 Drawing Sheets

ADAPTIVE QUERY EXPRESSION BUILDER FOR AN ON-DEMAND DATA SERVICE

BACKGROUND OF THE INVENTION

1. Field of the Invention

The present invention relates to the field of database driven applications and more particularly to query processing for database driven applications.

2. Description of the Related Art

Database driven computing applications have formed the foundation of practical, enterprise computing for decades. Database driven computing applications relate to the free access by application logic of data stored and managed by a database management system. In this regard, in a database driven computing application, the application developer focuses on business logic, while the database architect focuses on efficient database design. Due to this separation of concerns, the marriage of data storage and management, and application logic has resulted in a voluminous collection of database driven computing applications providing advancements in industrial productivity far beyond that known prior to the age of personal computing.

Database driven applications can include database storage subsystems that range from the simplistic flat-file database systems to complex, relational database systems. In simplistic flat file systems, the data in the database can be accessed directly by the program logic of the application. By comparison, in complex, relational database systems, carefully structured queries can be applied by the program logic of the application. Recent distributed forms of the database driven application utilize service oriented architectures where published services process queries against coupled data stores.

Database driven computing applications, especially those that require access to remote, self-contained database subsystems, center around sequences of queries and result sets produced by queries, each arising in the course of the execution of application logic. Oftentimes, a database subsystem mediator such as a database connectivity framework facilitates each transaction associated with a query. The queries themselves conform to a pre-determined query language and, in that regard, the structured query language (SQL) represents the most well-known query language in use today. As SQL is a language which is separate in syntax and grammar from other programmatic languages used to establish program logic, essentially, a database driven application is an application defined by one programmatic language into which another programmatic language has been embedded.

The embedded nature of database driven applications results in a very tight coupling between the program code of the application and the specific queries executed against a data store. Consequently, minor variations in a desired query can result in a massive change to the underlying program code of the application. Similarly, to achieve many different, albeit similar queries against a data store in an application, significant program code must be incorporated in the application itself to support the many different variants of the desired query.

BRIEF SUMMARY OF THE INVENTION

Embodiments of the present invention address deficiencies of the art in respect to database query management and execution and provide a novel and non-obvious method, system and apparatus for processing an adaptive query expression in an on-demand data service. In one embodiment of the invention, an adaptive query handling method can include receiving an initial query in a database driven application, parsing the initial query to identify a query expression key, matching the query expression key to an adaptive query expression, and transforming the adaptive query expression to a final query expression through a replacement of annotations in the adaptive query expression with static expressions conforming to a query language for the final query expression Thereafter, the final query expression can be applied to a database subsystem for the database driven application.

In another embodiment of the invention, a database driven application hosting data processing system can be configured for adaptive query expression handling. The system can include a database driven application coupled to a database subsystem and business context engine. The system further can include an adaptive query processor coupled to the database driven application, business context engine and database system, and further coupled to a plurality of adaptive query expressions. The adaptive query processor can include program code enabled to parse an initial query in the database driven application to identify a query expression key, to match the query expression key to an adaptive query expression among the adaptive query expressions, to transform the matched adaptive query expression to a final query expression through a replacement of annotations in the matched adaptive query expression with static expressions conforming to a query language for the final query expression, and to apply the final query expression to the database subsystem.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for adaptive query processing for database driven applications. In accordance with an embodiment of the present invention, adaptive query expressions can be received for transformation into static query expressions. The adaptive query expressions can specify a data query in addition to annotations indicating points of variability in the adaptive query expression. Each annotation can be replaced with a static sub-expression consistent with the configured language. The replacement can be performed by reference to the contemporaneous context of the received adaptive query expression, or contemporaneously supplied query constraints. Thereafter, the static query expression can be applied to the intended database sub-system.

Figure 1:
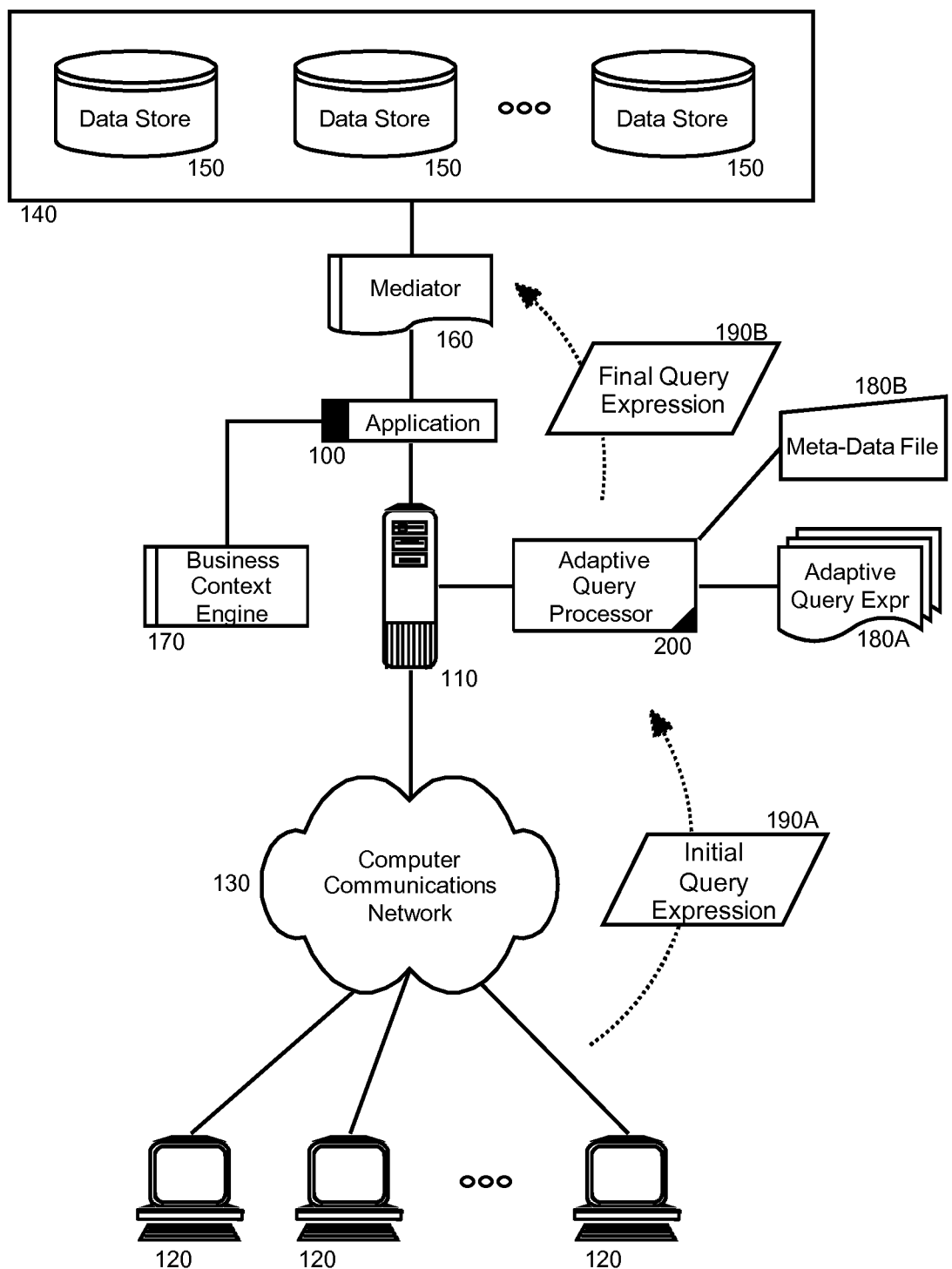
FIG. 1 is a schematic illustration of a database driven data processing system configured for adaptive query processing.

In further illustration, FIG. 1 is a schematic illustration of a database driven data processing system configured for adaptive query processing. The system can include a host computing platform 110 configured for coupling to one or more client computing devices 120 over a computer communications network 130. The host computing platform 110 can support the operation of a database driven application 100 coupled to a database subsystem 140 including one or more data stores 150. Optionally, a database mediator 160 can act as an intermediary between the database subsystem 140 and the database driven application 100. In this regard, the database mediator 160 can implement a database connectivity framework providing a corresponding connectivity interface.

Notably, the database driven application 100 can be coupled to a business context engine 170. The business context engine 170 can include program code enabled to provide context for a contemporary transaction in the database driven application 100, including environmental parameters, the state of a process for the contemporary transaction, the identity of the requestor, the language in use, the portion of the application from which the contemporary transaction originated and the like. The database driven application 100 further can be coupled to an adaptive query processor 200 and a set of adaptive query expressions 180A, each corresponding to a particular unique expression key.

The adaptive query processor 200 can include program code enabled to receive and process an initial query expression 190A into a final query expression 190B, before forwarding the final query expression 190B on to the database subsystem 140. The initial query expression 190A can include a static portion and a variable portion. The static portion of the initial query expression 190A can remain unchanged from query to query, whereas the variable portion of the initial query expression 190A can include points of variability that change from query to query. The points of variability can include more detailed information provided in the initial query expression 190A, or contextual information provided by the business context engine 170. Finally, a metadata file 180B coupled to the adaptive query processor 200 can describe the relationship between the logic model used by the initial query expression 190A and the physical database schema reflected in the database subsystem 140.

In this regard, multiple pre-defined annotations can be supported by the adaptive query processor 200. Supported annotations can include, by way of example, a column definition for the query, a context for the query, a parametric search for the query, subtype table support for the query, and primary keys support for the query. Upon receiving an initial query expression 190A, the program code of the adaptive query processor 200 can identify an expression key within the initial query expression 190A and locate a particular one of the adaptive query expressions 180A corresponding to the expression key. Thereafter, the annotated portions of the located adaptive query expression 180A can be populated with data corresponding to the variable portions of the initial query expression 190A in order to produce the final query expression 190B. Thereafter, the final query expression 190B can be applied to the database subsystem 140.

Figure 2:
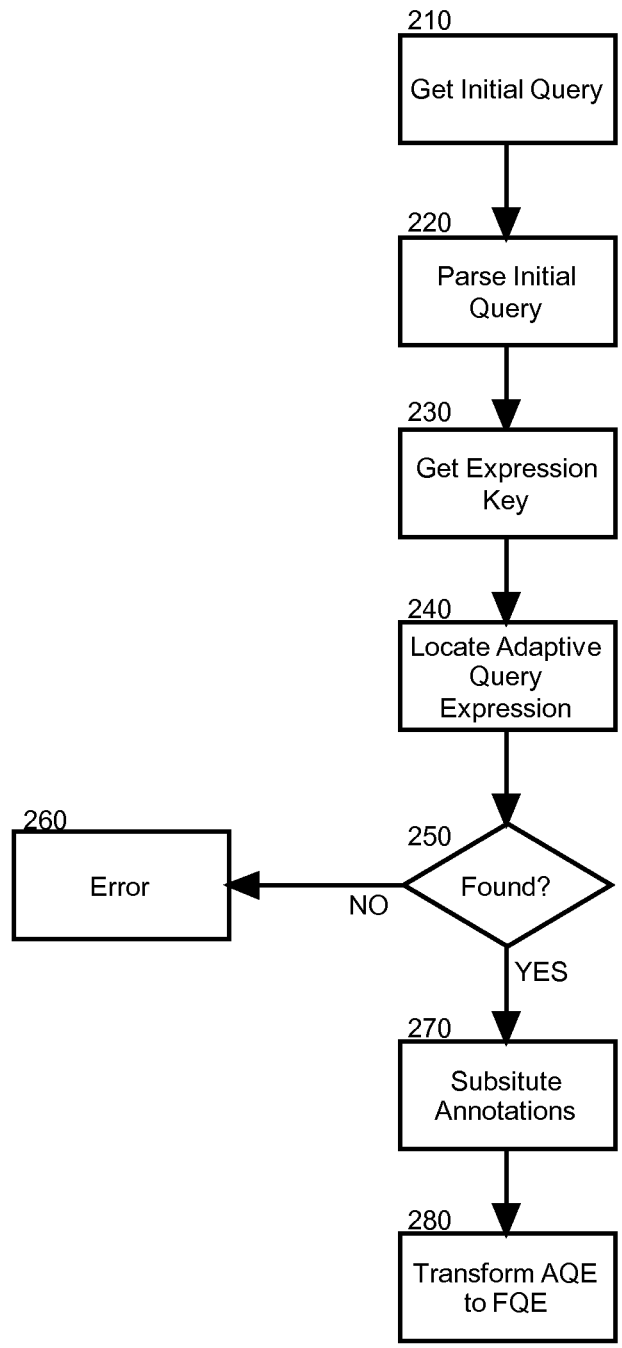
FIG. 2 is a flow chart illustrating a method for adaptive query processing in the database driven data processing system of claim 1; and, FIG. 3 is a flow chart illustrating a process for transforming an initial query expression into a final query expression in the method of FIG. 2.

In yet further illustration, FIG. 2 is a flow chart illustrating a method for adaptive query processing in the database driven data processing system of claim 1. Beginning in block 210, an initial query expression can be received. For instance, the initial query expression can be an extensible markup language (XML) path (XPATH) expression that expresses a desired query on the logical model governed by XML structure. An exemplary syntax for the initial query expression can conform to the extended Backus-Naur Form notation as follows:

```
<XPath>:= '/' RelativeLocationPath
   <RelativeLocationPath>:= Step | RelativeLocationPath '/' Step
   <Step>:= Name (<Predicate>)*
<Predicate>:= '[' <PredicateExpr> ']'
<PredicateExpr>:= <OrExpr>
<OrExpr>:= <AndExpr> | <OrExpr> 'or' <AndExpr>
<AndExpr>:= <RelationalExpr> | <AndExpr> 'and' <RelationalExpr> |
'(' <OrExpr> ')'
<Relational Expr> : = <Property> <Operator> <Value> |
<StringMatchingFunction>'
         ('<Property> | ',' <Value>')', <RelativeLocationPath>
         <Operator> := '<' | '>' | '<=' | '>=' | '=' | '!='
<String MatchingFunction>: = 'starts-with' | 'contains'
<Value>:= <Literal> | <Number>
<Literal>: = '"' [^"]* '"' | "'" [^']* "'"
<Number>:= <Digits> ('.' <Digits>?)? | '.' Digits
<Property>:= ('@')?<Name>
<Noun>:= <Name>
<Component>:= <Name>
<Name>:= (<Letter> | '_') (<Letter> | <Digit>)
<Letter>:= [a–zA–Z]
<Digit>:= [0–9]
<Digits>:= [0–9]+
```

In block 220, the initial query expression can be parsed and in block 230 an expression key can be located within the initial query expression. In this regard, a portion of the initial query expression can be identified as an expression key. For example, the initial query expression "/Table [@propertyname=value]" can result in an expression key "/Table[@propertyname=]". As such, in block 240, an adaptive query expression mapped to the expression key can be located and retrieved for use. The adaptive query expression can include both static, unchanging portions of a query along with the annotations representing points of variability in the adaptive query expression. In decision block 250, if an adaptive query expression cannot be located for the expression key, in block 260 an error can be returned. Otherwise, in block 270, the annotations included in the located adaptive query expression can be substituted with by the context of the transaction supplied by the a business context engine, or by the metadata information, which maps the logical model expressed in the initial query to the physical model of the database schema. Thereafter, in block 280 the adaptive query expression can be transformed into a final query expression.

Notably, the adaptive query expressions can include familiar SQL statements encountered in normal relational database along with additional annotations. Each of the adaptive query expressions can include one or more annotations to allow the adaptive query processor to transform the adaptive query expression into an appropriate SQL statement or statements in a final query expression that is schema specific and context-aware. As an example, the following annotations can be defined:

Column Definition syntax:
   COLS:name=tablename:column1, column2, . . . (comma separated list of columns) or
   COLS:name=tablename.* (wildcard to denote all columns)

To refer to the column definition, the column definition can be annotated with the "$" symbol. During transformation, the column definition can be replaced by the specified column names of the table to produce a final query expression. This annotation provides significant flexibility in the physical database schema design. Additional new columns can be added without modifying the adaptive query expressions themselves. Also, any last minute change of the ordering of the columns by database architect to fine tuned the database can be performed without affecting all the adaptive query expressions involved. Likewise, to refer to a context annotation, the syntax, "$CTX:contextname$" can be incorporated in the adaptive query expression and replaced during transformation with the requested context data provided by the business context engine. Similarly, to refer to the annotation of a parameter in the initial query expression, the prefix "?" can be added before and after the XPATH property name. Also, a parametric search annotation can be supported through the syntax $ATTR_TBLS$ to refer to a list of attribute tables to be inserted in the FROM clause, and through the syntax $ATTR_CNDS$ to refer to attribute search conditions to be inserted in WHERE clause.

A sub-type annotation can be supported through the syntax $SUBTYPE_COLS$ to refer to a list of subtype columns to be inserted in SELECT clause, the syntax $SUBTYPE_TBL$ to refer to a list of subtype tables to be inserted in the FROM clause, the syntax $LOJ_SUBTYPE_TBLS$ to refer to a list of subtype tables to be provided as an outer join in the FROM clause, and the syntax $SUBTYPE_CNDS$ to list of join conditions on the subtype table in WHERE clause. Finally, primary key annotation can be supported through the syntax $ENTITY_PKS$. The $ENTITY_PKS$ syntax can refer to a list of primary keys (from another table) to be inserted either as subselect or a list of the actual primary keys. All these annotations are supported through the metadata information describing the relationship between the logical model in the initial query and the physical database schema.

Figure 3:
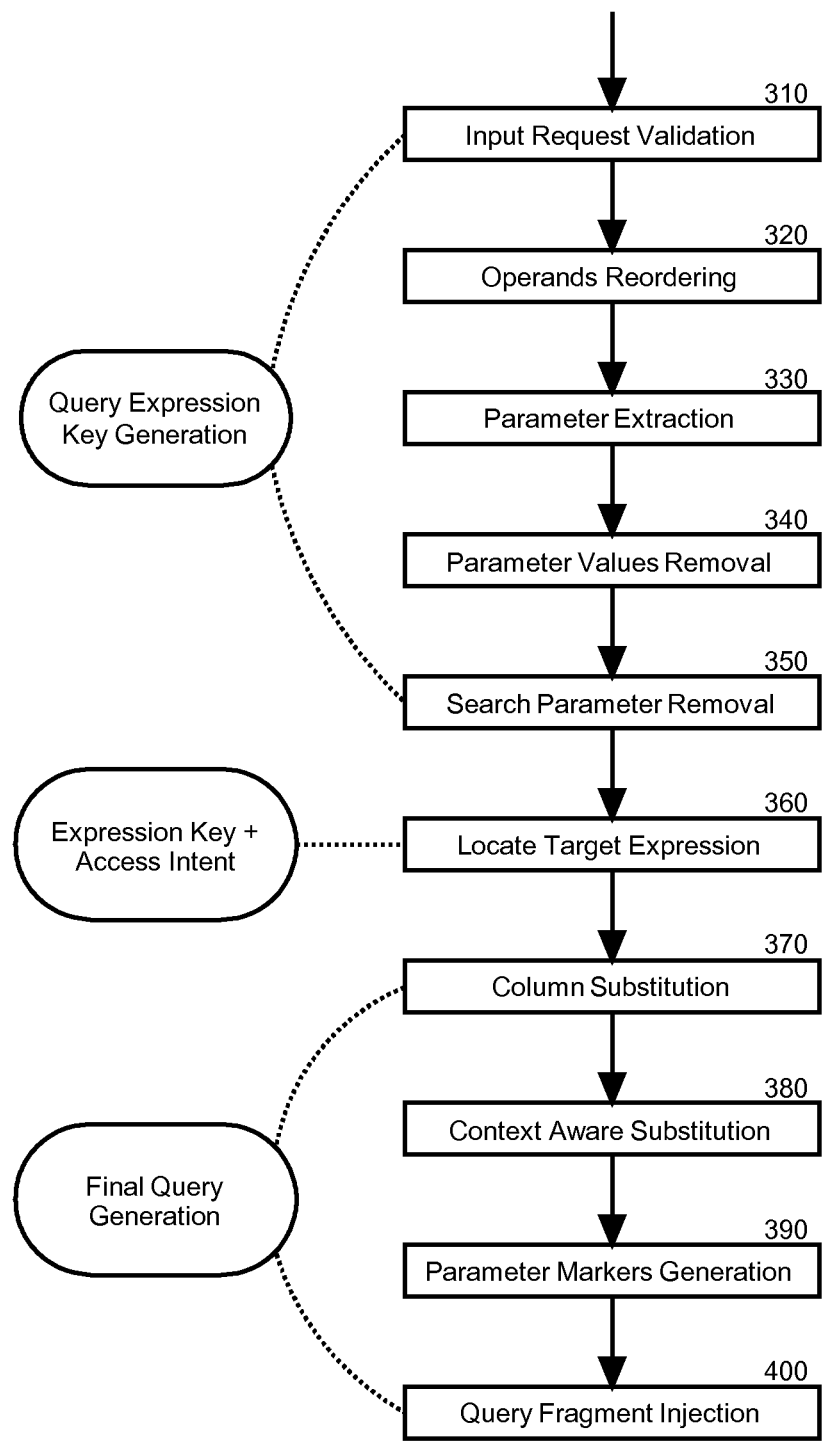

Turning now to FIG. 3, a flow chart is shown that illustrates a process for transforming an initial query expression into a final query expression in the method of FIG. 2. In block 310, the input request can be validated to ensure conformance with the XPath expression syntax or whatever additional restrictions may be imposed by the processor. In block 320, the operands of the input expression can be re-ordered in accordance with a pre-defined protocol to ensure that semantically identical input requests resolve to the same key expression. For instance, the operands in addition to the 'or' and 'and' operators in the predicate expressions can be re-ordered in the predefined fashion, such as alphabetical in ascending order. This is to ensure that semantically identical XPath expressions are mapped to the same key. Likewise, the parenthesized 'or' expressions can be replaced with an abbreviated form, <property>*=, if its operands have the same property name. This is to ensure that a single adapter query expression can be used to handle unknown number of the same attributes. This greatly avoids the unnecessary proliferation of adapter query expressions required.

In block 330, parameter and its corresponding value can be extracted to form a collection of name-value pairs. To distinguish parameters having the same names, the names in the collection can be indexed by appending to the parameter names the character "." and an index value based upon the order of the appearance. The collection later can be used in SQL parameter markers injection. Thereafter, in block 340, the attribute values from the XPath relational expressions can be removed and in block 350 the search attributes provided in the predicates of the XPath expression referred to as 'attributes' can be removed. At the end of these steps, the input XPath request will have been transformed into a unique query expression key. Together with the access intent, this key can be used to uniquely identify one or more adaptive query expressions. The access intent helps identify the amount of information to be retrieved as the initial query expression only indicates the objects of interest. These adaptive query expressions can be further processed to generate the final query expression The following table contains examples of XPath expressions and their corresponding keys.

| XPath Expression | Key |
| --- | --- |
| /CatalogGroup[@catalogGroupId=' 123'] | /CatalogGroup[@catalogGroupId=] |
| /CatalogGroup[@relationshipType=' 1' and @catalogGroupId='– 1'] | /CatalogGroup[@catGroupId= and @relationshipType=] |
| /CatalogEntry[attributes [@name='volume' and @value=1000] and @ subtype='beverage'] | /CatalogEntry[attributes and @subtype=] |

In block 360, a target adaptive query expression can be located for the generated query expression key. As an example, the available adaptive query expressions can be defined in one or more query expression files. Each query expression file can be divided into four different sections: (1) column definition; (2) one or more adaptive query expression definitions; (3) one or more associated query expression definitions; and (4) one or more access intent definitions. The column definition section can define one or more logical schema names to represent corresponding actual schema names. In this way, the adaptive query expressions can be adapted to a new schema when the actual schema is slightly different than the original schema, for instance through a different ordering of the columns or where the schema is extended as part of a customization.

The adaptive query expression section, in turn, can define one or more adaptive query expressions. Each adaptive query expression can be uniquely identified by a query expression key as described above. The adaptive query expression can be a SQL statement with additional annotations supported by the adaptive query processor. The adaptive query expression can be used to identify the target record and entry given the input request selection criteria. For example, the adaptive query expression can simply select all the primary keys of the target object given the criteria. The associated query expression section can be similar to the adaptive query expression section; however, each associated query expression can be uniquely identified by a unique name.

Specifically, the associated query expressions can be used to define the scope of a result set data given the identities of the target objects. For example, the associated query expression can select all of the properties and attributes associated with the target objects given the primary keys of the target objects. Additionally, multiple associated query expressions can be defined for the same set of target objects. For example, one associated query expression can return all the properties, descriptions and pricing information for a catalog entry, while another associated query expression can return only the identifier and short description of a catalog entry. Thus, each associated query expression has its own scope in terms of the amount of data to be returned.

The associated query expression can be used in conjunction with access intent. The access intent can be uniquely identified by a name and can be associated with one or more associated query expression through their names. For example, one access intent can be defined to return catalog entry basic information while another one can be used to return catalog entry and its corresponding up-sell or/and cross-sell information. By associating the access intent with the appropriate associated query expression (through the unique names), the appropriate amount of information can be returned given the same target objects. To locate the target adaptive query expression, the adaptive query processor can generate the query expression key to locate the query expression defined in the query expression section. Together with the access intent name (which can be passed into the adaptive query processor or can be obtained through a business context engine, the set of associated query expressions can be located.

In block 370, a schema (column) substitution can be performed as a first step of transforming an adaptive query expression into a final query expression. The schema substitution can include substituting the actual column names into the final query expression. Likewise, in block 380, a context aware substitution, if any, can be performed. During the context aware substitution, all context annotations used in the adaptive query expression can be modified with the actual value of the context. To that end, the adaptive query processor can interact with the business context engine based upon the context name used in the annotation together with the configuration information to determine the actual context name as well as the context properties that are of interest.

In block 390, parameter markers can be generated. The generation of parameter markers can include the identification of any parameter by corresponding parameter annotations. The identified parameters can be replaced by appropriate SQL parameter markers. The order of the parameters can be maintained within the collection. As a result, when the final query expression is received in the database mediator, the collection of name-value pairs for the parameters can be used to specify the parameter values.

Finally, in block 400, any query fragment injections can be handled. In this regard, there are two kinds of query fragments that can be injected in the query expression to form the final query depending upon the annotations used in the query: subtype tables, columns and conditions; and, search predicates. In the former circumstance, metadata information can be used to resolve the subtype tables and their attributes. If subtype columns are injected into the SQL select list, the SQL result set is updated with the information about these columns. In the latter circumstance, the search predicates can be resolved and injected into the query expression used for parametric search. Thereafter, the final expression having been formed, the final expression can be forwarded to the database mediator for execution.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An adaptive query handling method comprising:
receiving an initial query in a database driven application executing in a host computing platform;
parsing the initial query to identify a query expression key;
matching the query expression key to an adaptive query expression, the adaptive query expression specifying a data query in addition to annotations indicating points of variability in the adaptive query expression, each annotation being replaced with a static sub-expression consistent with a configured query language for a final query expression;
transforming the adaptive query expression to the final query expression through a replacement of the annotations in the adaptive query expression with static expressions conforming to the query language for the final query expression; and,
applying the final query expression to a database subsystem for the database driven application.

2. The method of claim 1, wherein receiving an initial query in a database driven application, further comprises validating the initial query to ensure conformance with a syntax for extensible markup language (XML) path (XPath).

3. The method of claim 1, wherein parsing the initial query to identify a query expression key comprises:
reordering operands in the initial query according to a pre-configured ordering protocol;
extracting parameter names and corresponding parameter values from the initial query; and,
removing parameter values from the initial query along with search parameters.

4. The method of claim 1, wherein matching the query expression key to an adaptive query expression comprises:

locating a plurality of adaptive query expressions corresponding to different combinations of associated query expressions and corresponding access intent in a query expression file; and, resolving to a single adaptive query expression based upon known access intent.

5. The method of claim 1, wherein transforming the adaptive query expression to a final query expression, comprises substituting annotated column syntax with actual column names for a table.

6. The method of claim 1, wherein transforming the adaptive query expression to a final query expression comprises:

receiving a context value from a business context engine; and, substituting an annotated context aware syntax with the context value.

7. The method of claim 1, wherein transforming the adaptive query expression to a final query expression comprises:

identifying parameters for corresponding parameter annotations; and, replacing the identified parameters with corresponding structured query language (SQL) parameter markers.

8. The method of claim 1, wherein transforming the adaptive query expression to a final query expression, comprises injecting one of subtype tables and search predicates into the final query expression.

9. The method of claim 1, wherein applying the final query expression to a database subsystem for the database driven application, comprises applying the final query expression to a database mediator for a database subsystem for the database driven application.

10. A database driven application hosting data processing system configured for adaptive query expression handling, the system comprising:

a database driven application executing in a host computing platform and coupled to a database subsystem and business context engine; and, an adaptive query processor coupled to the database driven application, business context engine and database system, and further coupled to a plurality of adaptive query expressions, the adaptive query processor comprising program code enabled to parse an initial query in the database driven application to identify a query expression key, to match the query expression key to an adaptive query expression among the adaptive query expressions, the adaptive query expression specifying a data query in addition to annotations indicating points of variability in the adaptive query expression, each annotation being replaced with a static sub-expression consistent with a configured query language for a final query expression, to transform the matched adaptive query expression to the final query expression through a replacement of the annotations in the matched adaptive query expression with static expressions conforming to the query language for the final query expression, and to apply the final query expression to the database subsystem.

11. The system of claim 10, wherein the program code of the adaptive query process is further enabled to match the query expression key to the adaptive query expression utilizing context provided by the business context engine.

12. A computer program product comprising a computer usable storage medium comprising a memory device having computer usable program code for adaptive query handling, the computer program product including:

computer usable program code for receiving an initial query in a database driven application;

computer usable program code for parsing the initial query to identify a query expression key;

computer usable program code for matching the query expression key to an adaptive query expression, the adaptive query expression specifying a data query in addition to annotations indicating points of variability in the adaptive query expression, each annotation being replaced with a static sub-expression consistent with a configured query language for a final query expression;

computer usable program code for transforming the adaptive query expression to the final query expression through a replacement of the annotations in the adaptive query expression with static expressions conforming to the query language for the final query expression; and, computer usable program code for applying the final query expression to a database subsystem for the database driven application.

13. The computer program product of claim 12, wherein the computer usable program code for receiving an initial query in a database driven application, further comprises computer usable program code for validating the initial query to ensure conformance with a syntax for extensible markup language (XML) path (XPath).

14. The computer program code of claim 12, wherein the computer usable program code for parsing the initial query to identify a query expression key, comprises:

computer usable program code for reordering operands in the initial query according to a pre-configured ordering protocol;

computer usable program code for extracting parameter names and corresponding parameter values from the initial query; and, computer usable program code for removing parameter values from the initial query along with search parameters.

15. The computer program product of claim 12, wherein the computer usable program code for matching the query expression key to an adaptive query expression, comprises:

computer usable program code for locating a plurality of adaptive query expressions corresponding to different combinations of associated query expressions and corresponding access intent in a query expression file; and, computer usable program code for resolving to a single adaptive query expression based upon known access intent.

16. The computer program product of claim 12, wherein the computer usable program code for transforming the adaptive query expression to a final query expression, comprises computer usable program code for substituting annotated column syntax with actual column names for a table.

17. The computer program product of claim 12, wherein the computer usable program code for transforming the adaptive query expression to a final query expression, comprises:

computer usable program code for receiving a context value from a business context engine; and, computer usable program code for substituting an annotated context aware syntax with the context value.

18. The computer program product of claim 12, wherein the computer usable program code for transforming the adaptive query expression to a final query expression, comprises:

computer usable program code for identifying parameters for corresponding parameter annotations; and, computer usable program code for replacing the identified parameters with corresponding structured query language (SQL) parameter markers.

19. The computer program product of claim 12, wherein the computer usable program code for transforming the adaptive query expression to a final query expression, comprises computer usable program code for injecting one of subtype tables and search predicates into the final query expression.

20. The computer program product of claim 12, wherein the computer usable program code for applying the final query expression to a database subsystem for the database driven application, comprises computer usable program code for applying the final query expression to a database mediator for a database subsystem for the database driven application.

* * * * *